(12) United States Patent
Aoki

(10) Patent No.: US 10,028,252 B2
(45) Date of Patent: Jul. 17, 2018

(54) COMMUNICATION DEVICE, CONTROL METHOD AND STORAGE MEDIUM

(71) Applicant: CANON KABUSHIKI KAISHA, Tokyo (JP)

(72) Inventor: Hitoshi Aoki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 186 days.

(21) Appl. No.: 14/626,250

(22) Filed: Feb. 19, 2015

(65) Prior Publication Data

US 2015/0245317 A1 Aug. 27, 2015

(30) Foreign Application Priority Data

Feb. 26, 2014 (JP) ................. 2014-035999

(51) Int. Cl.
*H04W 72/04* (2009.01)
*H04W 48/02* (2009.01)
(Continued)

(52) U.S. Cl.
CPC ........... *H04W 72/02* (2013.01); *H04W 36/06* (2013.01); *H04W 76/14* (2018.02)

(58) Field of Classification Search
None
See application file for complete search history.

(56) References Cited

U.S. PATENT DOCUMENTS

| | | | | |
|---|---|---|---|---|
| 2009/0016295 A1* | 1/2009 | Li | ............... | H04L 5/0007 370/330 |
| 2012/0076091 A1* | 3/2012 | Seok | ............... | H04L 5/0062 370/329 |

FOREIGN PATENT DOCUMENTS

| | | |
|---|---|---|
| JP | 2007143095 A | 6/2007 |
| JP | 2007208527 A | 8/2007 |
| JP | 2011259033 A | 12/2011 |

OTHER PUBLICATIONS

IEEE Standards Association, IEEE Standard for Information technology—Telecommunications and information exchange between systems Local and metropolitan area networks—Specific requirements, Part 11: Wireless LAN Medium Access Control (MAC) and Physical Layer (PHY) Specifications, IEEE Std. 802.11 (2012).

(Continued)

*Primary Examiner* — Kevin C Harper
*Assistant Examiner* — Derrick V Rose
(74) *Attorney, Agent, or Firm* — Carter, DeLuca, Farrell & Schmidt, LLP

(57) ABSTRACT

A communication device joins a wireless network and performs direct communication with another communication device that has joined the wireless network. The communication device performs, while performing direct communication with a first other communication device, determination of at least one of whether the communication device is performing direct communication with a second other communication device that is different from the first other communication device or whether the first other communication device is performing direct communication with a third other communication device. The communication device restricts switching of a channel for the direct communication with the first other communication device if the communication device is performing direct communication with the second other communication device or if the first other communication device is performing direct communication with the third other communication device.

15 Claims, 11 Drawing Sheets

(51) Int. Cl.
*H04W 76/02* (2009.01)
*H04W 72/02* (2009.01)
*H04W 76/14* (2018.01)
*H04W 36/06* (2009.01)

(56) References Cited

OTHER PUBLICATIONS

Office Action for Japanese Application No. 2014-035999 dated Oct. 30, 2017 with English Translation (9 pages).

\* cited by examiner

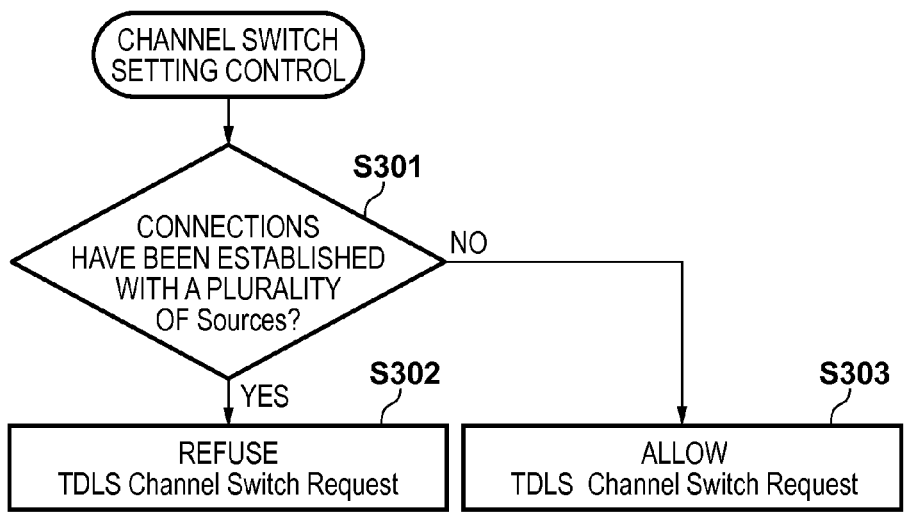
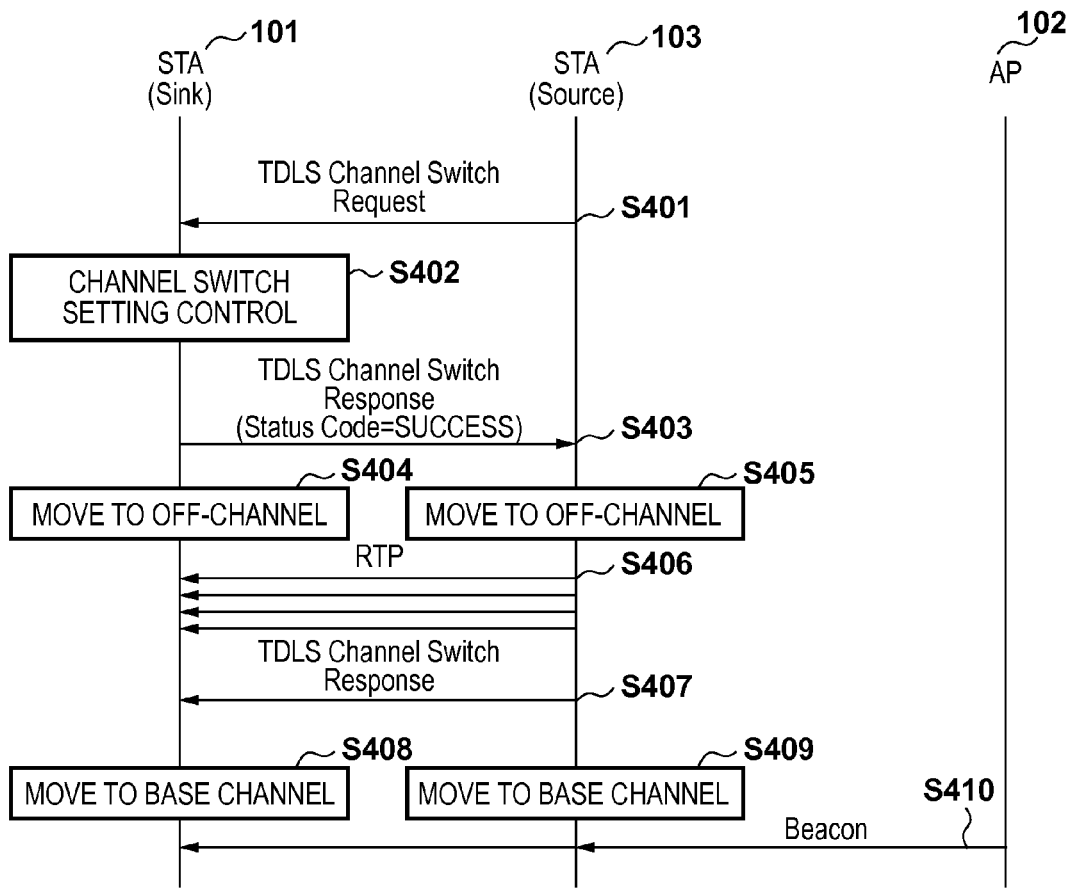

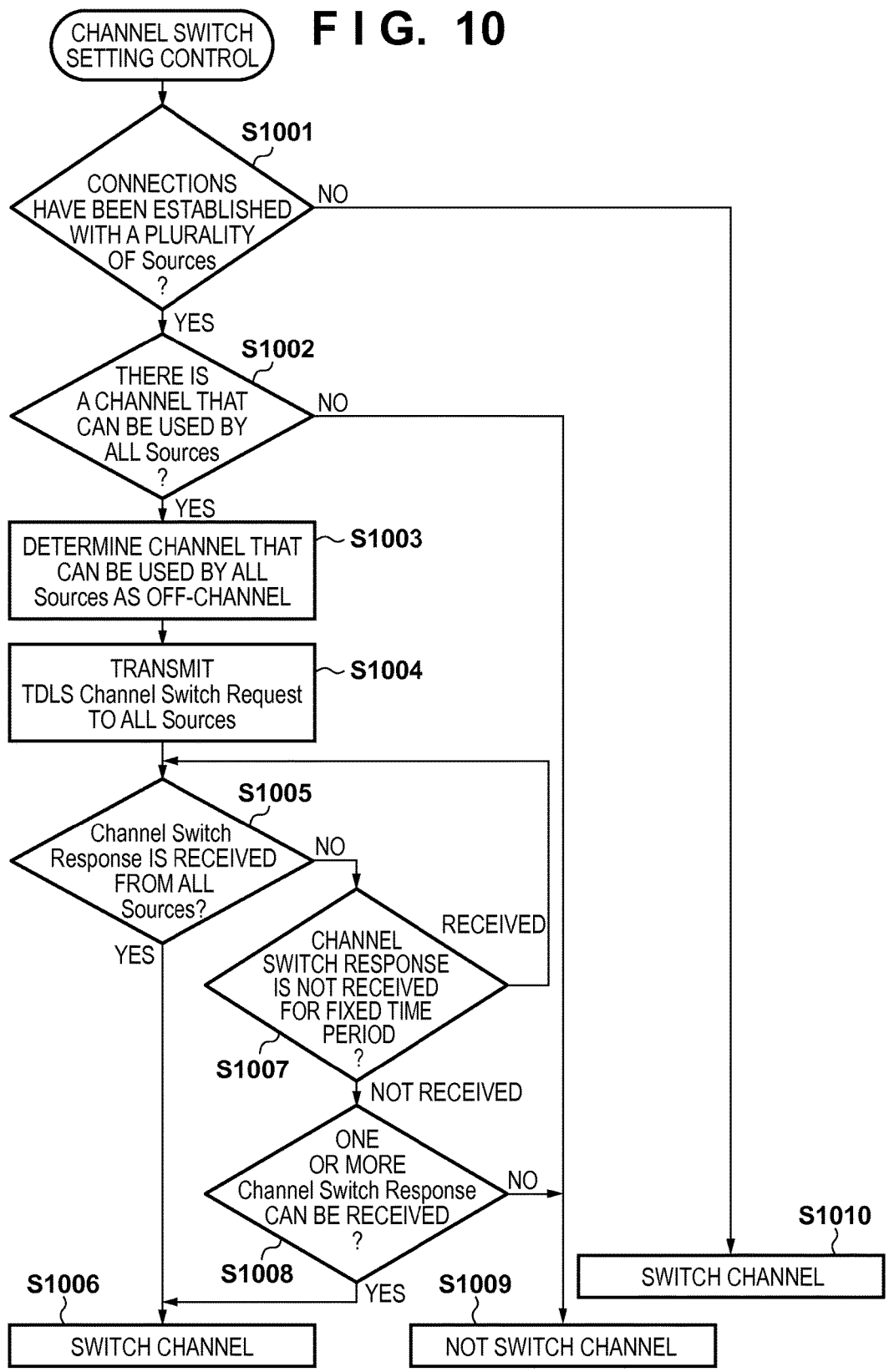
F I G. 10

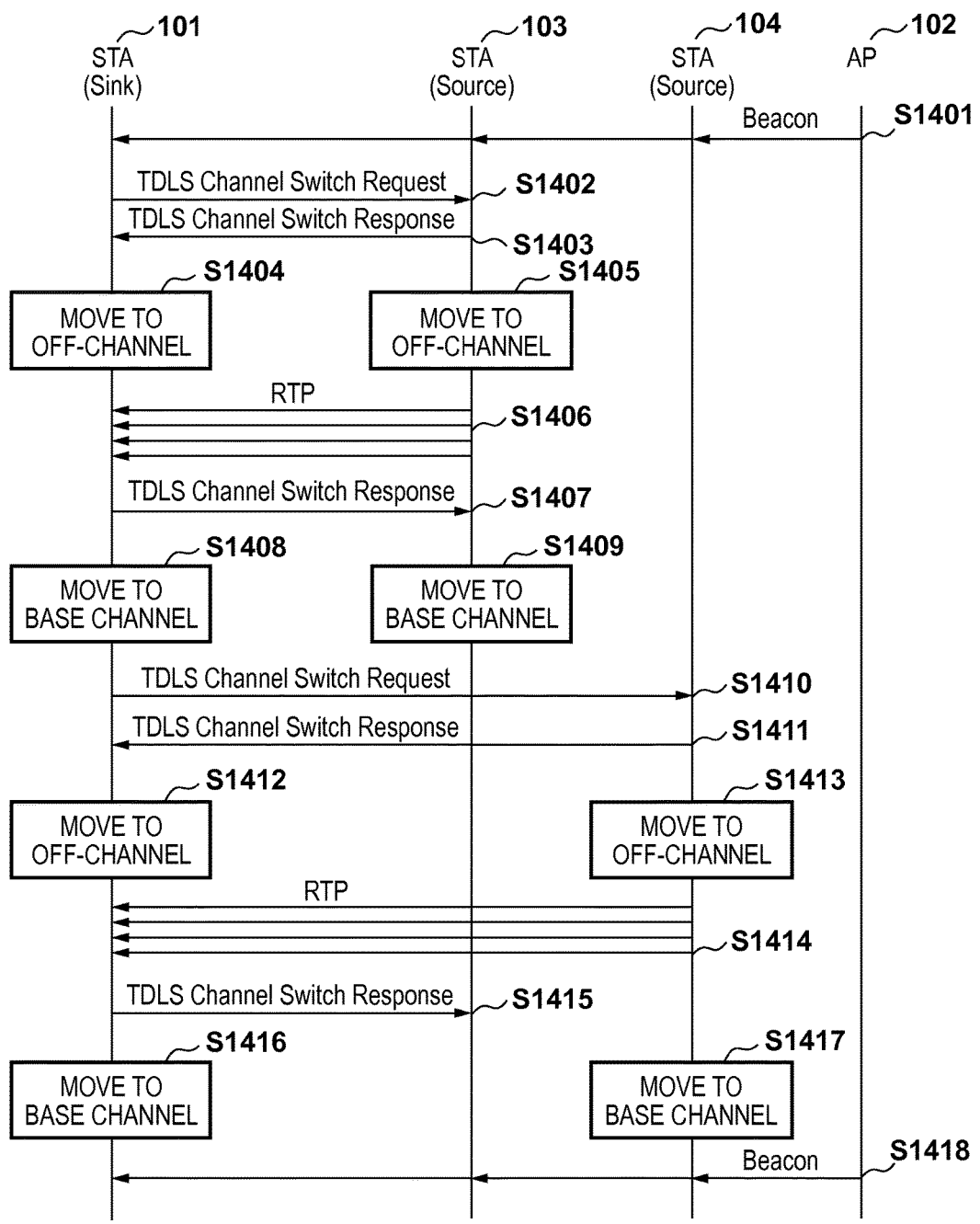

US 10,028,252 B2

COMMUNICATION DEVICE, CONTROL METHOD AND STORAGE MEDIUM

BACKGROUND OF THE INVENTION

Field of the Invention

The present invention relates to a channel switch control technique in wireless communication.

Description of the Related Art

Wireless LAN communication systems, which are represented by IEEE802.11 standard series, are widely used. With a wireless LAN, a base station called an access point (hereinafter, an AP) and a station (hereinafter, a STA) that exists within an area within which a radio wave of the AP can reach and that is in a wirelessly connected state establish a connection, establish a network, and wirelessly communicate with each other. In recent years, methods have emerged for performing communication not only with a simple wireless network configuration using conventional APs and STAs, but also in various modes of wireless LAN network. For example, Tunneled Direct Link Setup (TDLS) is a technique for communication between STAs that are connected to an AP, using a direct connection (direct link). IEEE Std 802.11-2012 describes a technique of forming a direct connection between wireless STAs by transmitting and receiving control data for setting TDLS via an AP between wireless LAN terminals. Since each wireless LAN terminal directly communicates with a partner terminal by forming a direct connection, communication can be performed that is not affected by restriction due to the capability of the AP.

With TDLS, a channel for direct communication between STAs is not fixed to a channel (hereinafter referred to as a "base channel") of a wireless network configured by the AP in a wireless network and can be switched to another channel (hereinafter referred to as an "off-channel"). As a result, for example, even when the AP operates with 2.4-GHz band, a STA can directly communicate with a partner STA by using a 5-GHz band channel.

Wi-Fi Display is video streaming communication using a direct connection by means of TDLS. Wi-Fi Display is a wireless direct streaming technique that is standardized by Wi-Fi Alliance. In Wi-Fi Display, a device that transmits video streaming is called a Source, and a device that receives video streaming is called a Sink. In Wi-Fi Display, either Wi-Fi Direct or TDLS is used for wireless connection. Communication devices that use Wi-Fi Display can transmit and receive video streaming therebetween without via an AP, as a result of establishing a direct connection using TDLS. As a result of switching of the channel by means of TDLS, the communication devices become able to transmit and receive video streaming with 5-GHz band, with which interference is relatively small, for example.

In the current situation, a consideration is not given to the influence of communication devices establishing a direct connection using TDLS and switching their channel on other direct connections that are established at this time point. That is to say, for example, problems in the case where a communication device, which has established a direct connection with a plurality of other communication devices, switches its channel for direct communication with one of the plurality of other communication devices have not been examined.

The present invention has been made in view of the aforementioned problem, and provides a technique for controlling a direct connection of a communication device with other communication devices, based on a state of other connection.

SUMMARY OF THE INVENTION

According to an aspect of the present invention, there is provided a communication device comprising: a communication unit configured to join a wireless network and perform direct communication with another communication device that has joined the wireless network; a determination unit configured to perform, while the communication device is performing direct communication with a first other communication device, determination of at least one of whether the communication device is performing direct communication with a second other communication device that is different from the first other communication device, and whether the first other communication device is performing direct communication with a third other communication device that is different from the communication device; and a restriction unit configured to restrict switching of a channel for the direct communication between the communication device and the first other communication device if the communication device is performing direct communication with the second other communication device or if the first other communication device is performing direct communication with the third other communication device.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a flowchart showing a flow of channel switch setting control in Embodiment 1.

FIG. 4 is a sequence chart showing a first example of a processing flow in Embodiment 1.

FIG. 10 is a flowchart showing a flow of channel switch setting control in Embodiment 3.

FIG. 14 is a sequence chart showing an exemplary processing flow in Embodiment 4.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

A description will be given below of the case where a wireless LAN conforming to IEEE802.11 standard series is used. However, the following embodiments describe examples, and the present invention is not limited thereto and is also applicable in the case where other similar systems are used. That is to say, the following discussion is applicable if a system is used in which a communication device establishes direct connections with a plurality of other communication devices and switching of a channel may possibly occur in one of these direct connections.

Note that the communication devices (STAs) described below use Tunneled Direct Link Setup (TDLS) in order to establish a direct connection. That is to say, when a communication device has joined a network configured by an access point (AP), the communication device establishes direct connections with other communication devices that join this network, using the network configured by the AP.

Exemplary Configuration of Wireless Communication System

Figure 1:
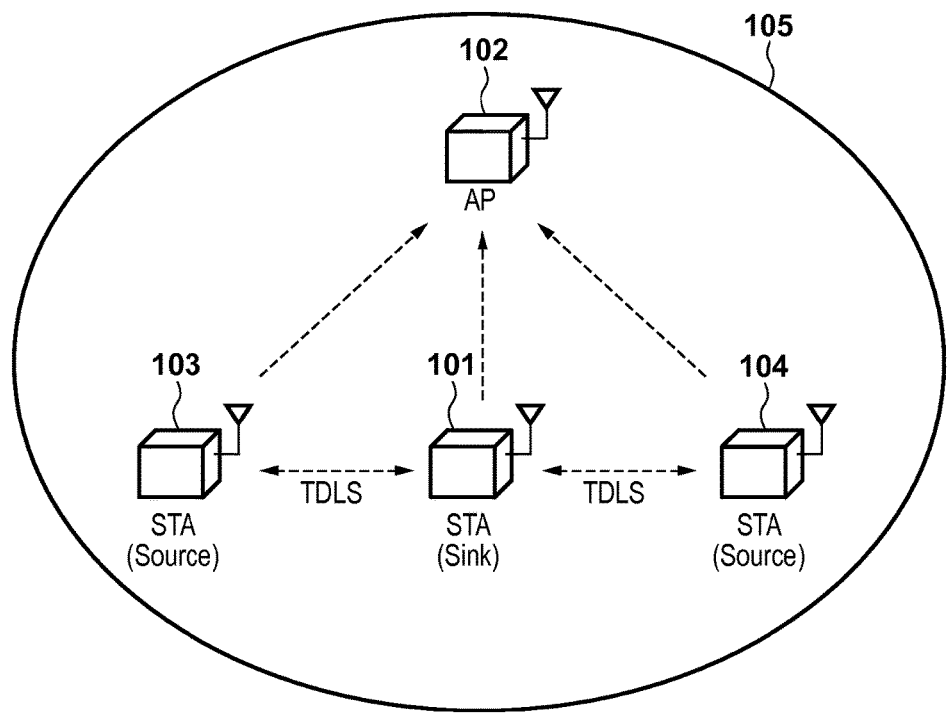
FIG. 1 is a diagram showing an exemplary configuration of a wireless communication system.

An exemplary configuration of a wireless communication system in the embodiments described below is shown in FIG. 1. This wireless communication system includes an access point (AP 102) and a plurality of terminals (STA 101, STA 103, and STA 104) that join a wireless network 105 configured by the AP 102.

The AP 102 is a base station (AP) of a wireless LAN that configures the wireless network 105. The STA 101 is a communication device capable of operating as a terminal using a wireless LAN conforming to IEEE802.11 standard series, and capable of directly communicating with the STA 103 and the STA 104 by means of TDLS, via the AP 102, for example. Similarly, the STA 103 and the STA 104 are communication devices capable of operating as terminals using a wireless LAN conforming to IEEE802.11 standard series, and capable of directly communicating with the STA 101 by means of TDLS, via the AP 102, for example. Note that, although all of the STA 101, the STA 103, and the STA 104 join the wireless network 105 in the example in FIG. 1, the present invention is not limited thereto. For example, a configuration may be employed in which the STA 103 joins a wireless network configured by a first AP, the STA 104 joins a wireless network configured by a second AP, and the STA 101 joins both of these wireless networks. With this configuration, for example, it is possible that the direct connection between the STA 101 and the STA 103 is established using the wireless network configured by the first AP, and the direct connection between the STA 101 and the STA 104 is established using the wireless network configured by the second AP.

The STA 101, which serves as a terminal (Sink) that receives a video conforming to the WiFi Display standard, receives video streaming from a terminal (Source) that transmits a video through direct communication. On the other hand, the STAs 103 and 104, which serve as Sources conforming to the WiFi Display standard, transmit video streaming to the Sink through direct communication. Thus, it is assumed that the STA 101 according to the following embodiments can extend the WiFi Display standard, establish direct connections with a plurality of other communication devices (Source) by means of TDLS, and receive a video as streaming.

In this wireless communication system, for example, the communication device (STA 101) restricts switching of the channel in conformity to TDLS when directly communicating with a plurality of other communication devices or when a partner device of direct communication is directly communicating with a plurality of communication devices. The following embodiments will describe, in detail, examples of a configuration of the communication device that performs such restriction and of specific processing to be executed.

First Embodiment

In the present embodiment, the STA 101, when directly communicating with a plurality of other STAs, performs control so as to prohibit switching of the channel even if a request to switch the channel is given from other STAs. The STA 101 thereby prevents direct communication with one of the plurality of other STAs from being disconnected as a result of switching the channel for direct communication with another one of the plurality of other STAs. A configuration of the STA 101 and processing executed by the STA 101 will be described below.

Configuration of STA 101

Figure 2:
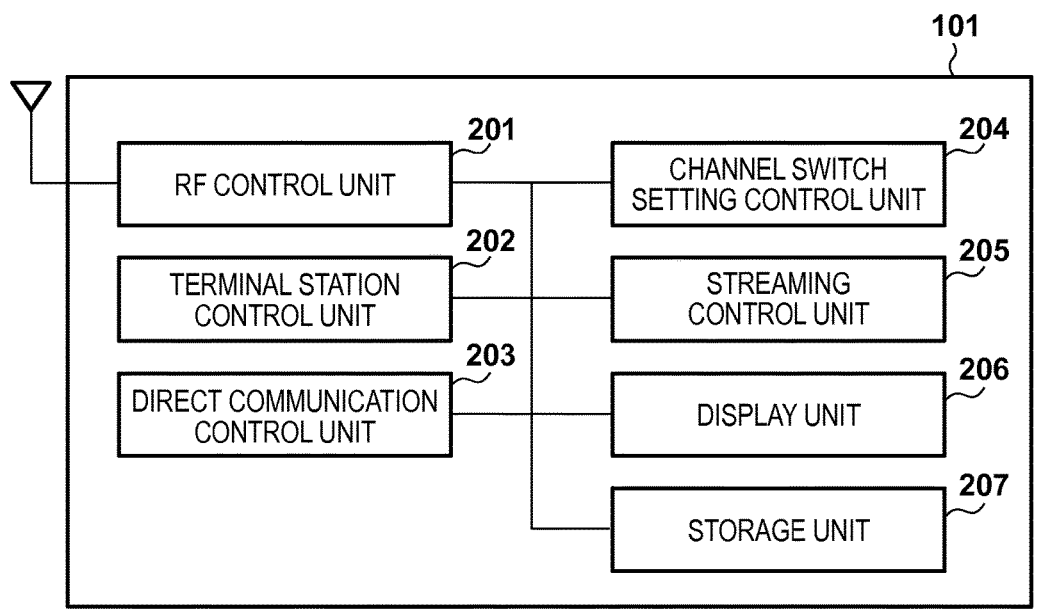
FIG. 2 is a block diagram showing an exemplary functional configuration of a STA 101 in Embodiment 1.

FIG. 2 is a block diagram showing an exemplary functional configuration of the STA 101 according to the present embodiment. For example, the STA 101 has an RF control unit 201, a terminal station control unit 202, a direct communication control unit 203, a channel switch setting control unit 204, a streaming control unit 205, a display unit 206, and a storage unit 207. One or more of these functional units can be implemented by one or more processors (CPUs) executing a computer program that can be stored in a storage medium, such as a memory (RAM or ROM).

The RF control unit 201 is configured to include an antenna for transmitting or receiving a wireless signal from/to other wireless LAN communication devices, a circuit, and a program for controlling them. The terminal station control unit 202 is configured to include hardware and a program for controlling the RF control unit 201 and functioning as a wireless LAN STA (terminal), for example. The terminal station control unit 202 performs control such that the STA 101 joins the wireless network 105 and communicates with the AP 102. The direct communication control unit 203 is configured to include hardware and a program for controlling the RF control unit 201 and directly communicating with the STAs 103 and 104 without via the AP 102 after establishing direct connections with the STAs 103 and 104 via the AP 102, for example.

The channel switch setting control unit 204 is constituted by a program for performing setting control related to switching of the channel, after a direct connection by means of TDLS is established, for example. The details of the setting control executed by the channel switch setting control unit 204 will be described later using FIG. 3.

The streaming control unit 205 is configured to include software and hardware for controlling streaming received by the STA 101, for example. Specifically, the streaming control unit 205 performs processing for receiving and decoding an RTP packet, and displaying a decoded image on the display unit 206, for example. The display unit 206 is configured to include a display for displaying a streaming image processed by the streaming control unit 205, and software and hardware for controlling the display. The storage unit 207 is constituted by a ROM and a RAM for saving a program and data for operating the STA 101, for example.

Channel Switch Setting Control

Subsequently, processing executed by the channel switch setting control unit 204 will be described using FIG. 3. The processing in FIG. 3 is executed when the STA 101 receives a TDLS Channel Switch Request from a STA to which the STA 101 has established a direct connection by means of TDLS.

In this processing, the channel switch setting control unit 204 initially determines whether direct connections by means of TDLS have been established with a plurality of Sources (S301). If connections have been established with a plurality of Sources (YES in S301), the channel switch setting control unit 204 decides to refuse the TDLS Channel Switch Request (S302). On the other hand, if a direct connection by means of TDLS has been established with only one Source (NO in S301), the channel switch setting control unit 204 decides to allow the TDLS Channel Switch Request (S303). That is to say, the channel switch setting control unit 204 permits switching of the channel if a connection has been established with only one Source, and refuses switching of the channel if connections have been established with a plurality of Sources.

Figure 5:
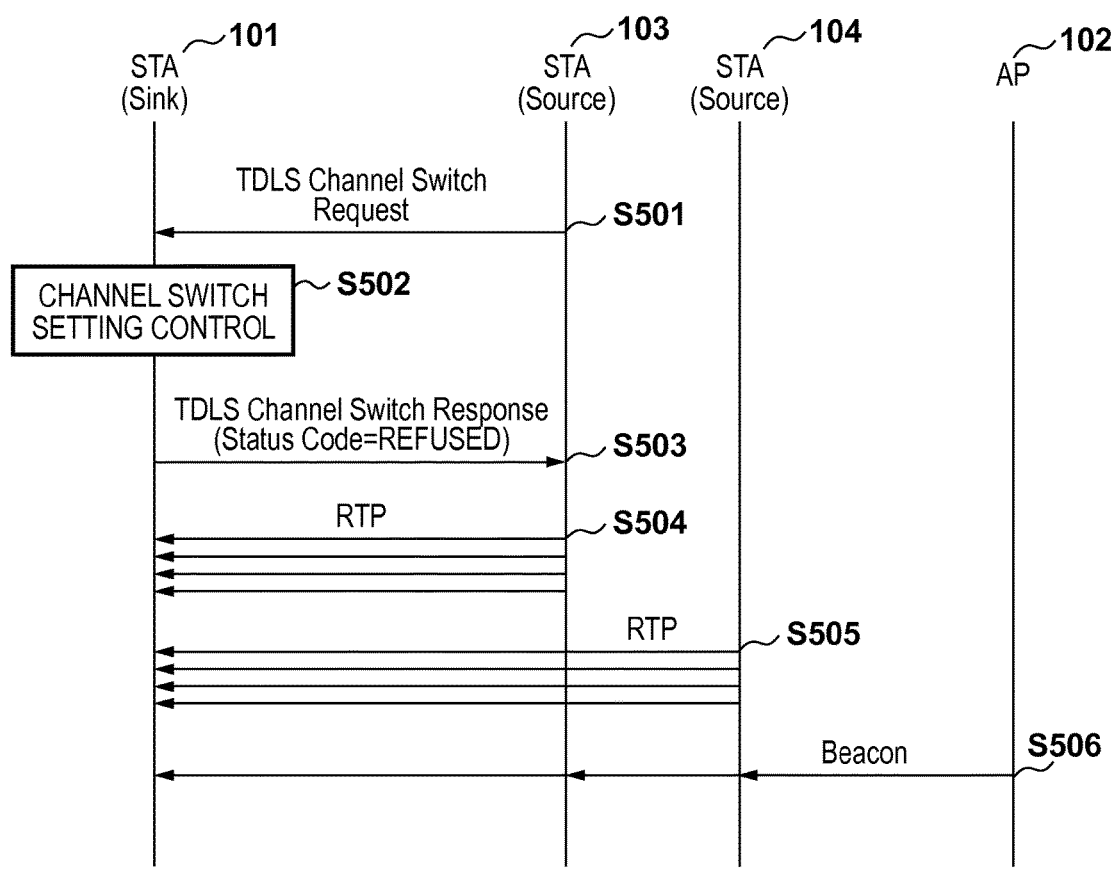
FIG. 5 is a sequence chart showing a second example of a processing flow in Embodiment 1.

Subsequently, a description will be given, using FIGS. 4 and 5, of a processing flow at the time when the STA 101 receives a TDLS Channel Switch Request from the STA 103. Note that FIG. 4 is a sequence chart showing a processing flow in the case where the STA 101 has established a direct connection by means of TDLS with only one Source (STA 103), and has not been established a direct connection by means of TDLS with the STA 104. FIG. 5 is a sequence chart showing a processing flow in the case where the STA 101 has established direct connections by means of TDLS with a plurality of Sources (STA 103 and STA 104). That is to say, in FIG. 5, the STA 101 possibly receives a frame by using direct connections by means of TDLS that are established with the STA 103 and the STA 104.

First, the case of FIG. 4 will be described. In the example in FIG. 4, the STA 103 transmits a TDLS Channel Switch Request to the STA 101 before transmitting streaming data (S401). That is to say, the STA 103 transmits, to the STA 101, a signal for giving a request to switch the channel. Note that this request is transmitted over a wireless channel (base channel) of the wireless network 105. The TDLS Channel Switch Request contains information of a switching destination channel (a channel that the STA 103 wants to use after switching the channel, an off-channel).

The STA 101, upon receiving the TDLS Channel Switch Request, performs the channel switch setting control shown in FIG. 3, using the channel switch setting control unit 204 (S402). In this case, the STA 101 has established a direct connection by means of TDLS only with the STA 103, and accordingly decides to permit the TDLS Channel Switch Request (S303, S402). Furthermore, in this case, the STA 101 responds to the STA 103, using a TDLS Channel Switch Response with a Status Code that is SUCCESS (=0) (S403). That is to say, the STA 101 transmits, to the STA 103, a signal indicating allowance of switching of the channel.

The STA 101, upon transmitting the TDLS Channel Switch Response, moves to the off-channel designated in the TDLS Channel Switch Request received in step S401 (S404). At this time, the STA 101 may transmit a QoS Null Frame with Power Management bit=1 (not shown) to the AP 102, and notifies the AP 102 that the STA 101 is in a state of being unable to receive a frame from the AP 102.

The STA 103, upon receiving the TDLS Channel Switch Response in step S403, moves to the off-channel that the STA 103 has designated in the TDLS Channel Switch Request in step S401 (S405). At this time as well, the STA 103 may transmit a QoS Null Frame with Power Management bit=1 to the AP 102. Note that processing in either step S404 or S405 may be executed first, in accordance with respective timings of the STA 101 and the STA 103 moving to the off-channel.

The STA 103, upon moving its channel, transmits an RTP packet, which is a video streaming packet, to the STA 101 over the channel to which the STA 103 has moved (S406). The STA 103, after transmitting the RTP packet, transmits a TDLS Channel Switch Response to the STA 101 when a timing of the AP 102 transmitting a Beacon is approaching (S407). This is performed in order to notify the STA 101 that the STA 103 returns to the base channel. Here, the TDLS Channel Switch Response for returning to the base channel may be transmitted from the STA 101. The STA 101 or the STA 103 may transmit a TDLS Channel Switch Response for returning to the base channel at any time before the timing of the AP 102 transmitting a Beacon, if not at this timing.

The STA 101, upon receiving the TDLS Channel Switch Response, returns its channel to the base channel (S408). Also, the STA 103, after transmitting the TDLS Channel Switch Response, returns its channel to the base channel (S409). At this time, processing in either step S408 or S409 may be executed first. Then, the STA 101 and the STA 103 can receive a Beacon from the AP 102 as a result of returning their channel to the base channel (S410).

Subsequently, the case in FIG. 5 will be described. Here, a description will be given of the case where the STA 101 has established direct connections by means of TDLS with the STA 103 and the STA 104 and receives a TDLS Channel Switch Request from the STA 103. Note that similar processing is also performed in the case where the STA 101 receives a TDLS Channel Switch Request from the STA 104.

The STA 103 transmits the TDLS Channel Switch Request to the STA 101 over the base channel (S501). The STA 101, upon receiving the TDLS Channel Switch Request, performs the channel switch setting control shown in FIG. 3, as in the case in FIG. 4 (S502). At this time, since the STA 101 has established direct connections by means of TDLS with a plurality of STAs, the STA 101 decides to refuse the TDLS Channel Switch Request (S302), as described using FIG. 3.

The STA 101, upon deciding to refuse the TDLS Channel Switch Request in step S502, transmits, to the STA 103, a response (TDLS Channel Switch Response) to the request in step S501 (S503). Here, the STA 101 transmits a TDLS Channel Switch Response with a Status Code that is REFUSED (=1) (S503). Note that, here, the STA 101 may transmit other information indicating refusal of the response in step S501, rather than setting REFUSED as the Status Code.

If the STA 103 is notified of the refusal of switching of the channel by the TDLS Channel Switch Response, the STA 103 does not move to the off-channel, and transmits the RTP packet over the base channel (S504). At this time, since the STA 101 has not moved its channel from the base channel, the STA 101 can also receive the RTP packet transmitted from the STA 104 (S505). Furthermore, since the channel of the STA 101, the STA 103, and the STA 104 remains the base channel, these STAs can also receive a Beacon from the AP 102 (S506). Note that, although the RTP packet is transmitted from the STA 104 after the RTP packet is transmitted from the STA 103 in FIG. 5, this order may be reversed. The STA that is to transmit a frame may be determined in the CSMA/CA format in a usual wireless LAN, for example.

In the case in FIG. 5, the STA 101 has established direct connections by means of TDLS with a plurality of STAs, unlike in the case in FIG. 4. Accordingly, if the STA 101 switches its channel after receiving the TDLS Channel Switch Request in step S501, the STA 101 will not be able to receive the RTP packet from the STA 104 while switching the channel. For this reason, a case is possible where video streaming delays in the STA 101, or where a screen is disturbed due to it. However, since the STA 101 according to the present embodiment refuses switching of the channel in step S503, such delay or disturbance of the screen can be prevented in advance.

As described above, in the present embodiment, when a communication device (STA 101) has established direct connections with a plurality of other communication devices (STA 103 and STA 104), control is performed so as to prohibit TDLS Channel Switch.

Note that, in the case where a STA has established direct connections by means of TDLS with a plurality of other STAs, any kind of control may be performed as long as control is performed so as to refuse a TDLS Channel Switch request. For example, when the STA has already established a direct connection by means of TDLS with another STA and thereafter receives a TDLS Setup Request from still another STA, the STA may refuse switching of the channel, by using an information element of a TDLS Setup Response. Specifically, the STA designates 0 as a TDLS channel switching bit of an Extended Capabilities Information Element of the TDLS Setup Response. The STA can thereby notify the partner device of being unable to perform TDLS Channel Switch. Furthermore, in this case, the STA has already notified the partner STA to which a direct connection by means of TDLS has already been established that the STA supports TDLS Channel Switch. For this reason, the STA may again set the TDLS channel switching bit to 0 and transmit the TDLS Setup Request to the partner STA, after temporarily disconnecting the direct connection by means of TDLS, using TDLS Teardown. Alternatively, with respect to the partner STA to which a direct connection by means of TDLS has already been established, the STA may configure a setting so as to refuse the TDLS Channel Switch Request, as shown in FIG. 5.

The STA may be configured not to respond to the TDLS Channel Switch Request, rather than transmitting REFUSED as the Status Code in response to the TDLS Channel Switch Request. Also, in the case where the STA has established direct connections by means of TDLS with a plurality of other STAs, various other methods may be used with which TDLS Channel Switch can be prohibited.

Second Embodiment

In the present embodiment, in the case where the STA 101, which is a partner of a direct connection with the STA 103, is directly communicating with a plurality of other STAs, the STA 103 performs control so as to prohibit switching of the channel between the STA 103 and the STA 101. The STA 103 thereby prevents direct communication between the STA 101 and other STAs from being disconnected as a result of switching the channel for the direct communication between the STA 103 and the STA 101. A configuration of the STA 103 that performs this control and the content of this processing will be described below.

Configuration of STA 103

Figure 6:
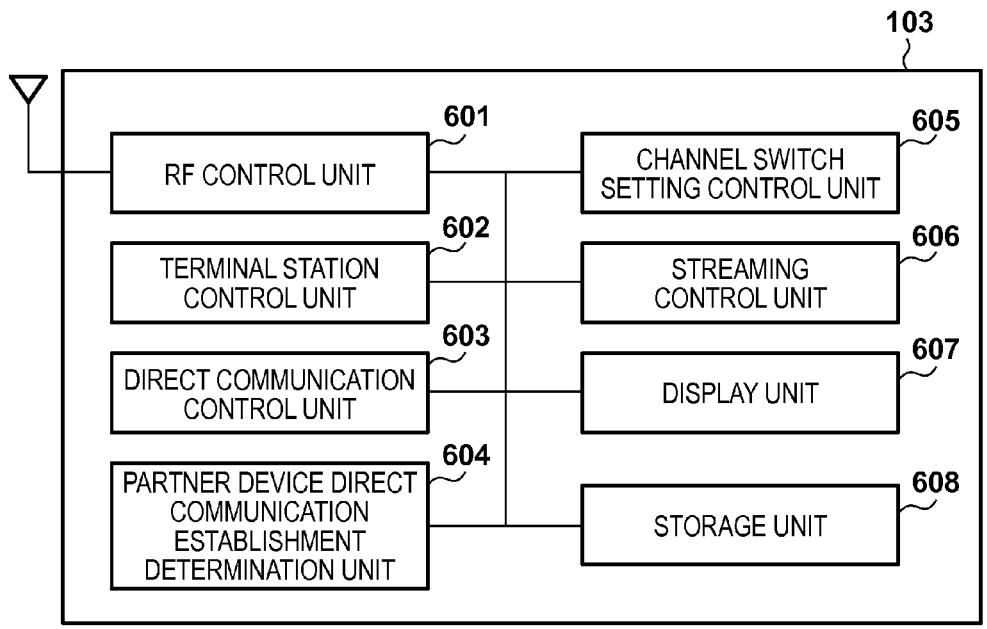
FIG. 6 is a block diagram showing another exemplary functional configuration of a STA 103 in Embodiment 2.

FIG. 6 is a block diagram showing an exemplary functional configuration of the STA 103. The STA 103 has an RF control unit 601, a terminal station control unit 602, a direct communication control unit 603, a partner device direct communication establishment determination unit 604, a channel switch setting control unit 605, a streaming control unit 606, a display unit 607, and a storage unit 608, for example. Among them, the RF control unit 601, the terminal station control unit 602, the direct communication control unit 603, and the storage unit 608 have the same functions as the functional units having the same names in the STA 101 shown in FIG. 2, and accordingly a description thereof will be omitted.

The partner device direct communication establishment determination unit 604 is configured to include software for determining whether a partner STA, to which the STA 103 has established a direct connection by means of TDLS, has established direct connections by means of TDLS with a plurality of STAs, for example. The detailed content of processing of the partner device direct communication establishment determination unit 604 will be described later using FIGS. 7 and 8.

The channel switch setting control unit 605 is constituted by a program for determining setting control related to switching of the channel, after establishing a direct connection by means of TDLS, for example. The detailed content of the processing of the channel switch setting control unit 605 will be described later using FIG. 9.

The streaming control unit 606 is configured to include software and hardware for transmitting video streaming, for example. Generation of an RTP packet for transmitting video streaming is executed in conformity to Wi-Fi Display. The display unit 607 is constituted by a display provided in the STA 103 and software for controlling the display, for example.

Figure 7:
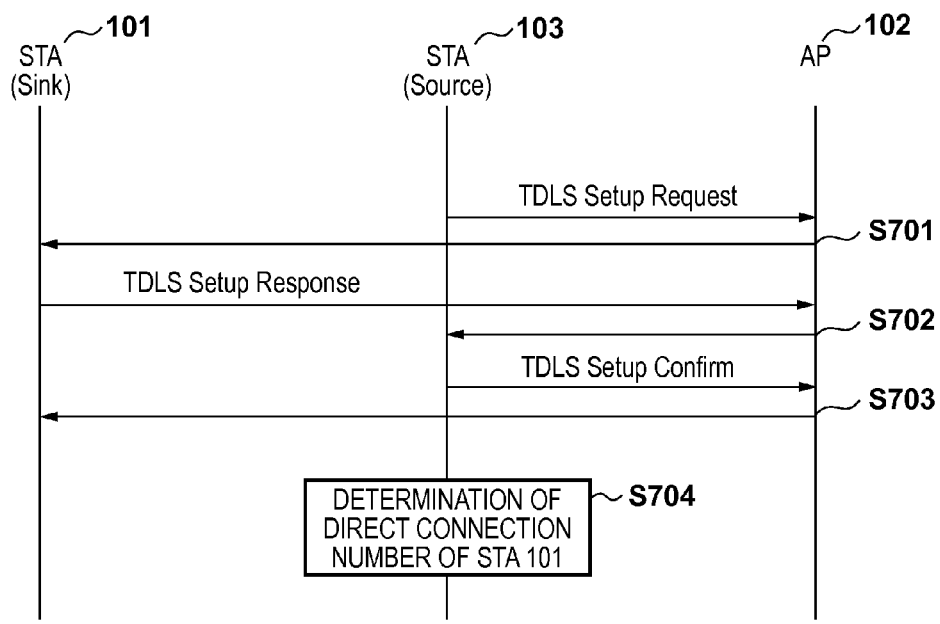
FIG. 7 is a sequence chart showing a flow of processing for determining a direct connection number of a partner device in Embodiment 2.

Processing for Determining Direct Communication Establishment Number of Partner Device FIG. 7 is a sequence chart showing a flow of processing by which the STA 103 determines whether the STA 101, which is a partner device of a direct connection, has established direct connections by means of TDLS with a plurality of other STAs. This determination processing is performed by a TDLS Setup Request and a TDLS Setup Response being transmitted and received between the STA 101 and the STA 103 via the AP 102, in the same manner as when establishing a usual direct connection by means of TDLS.

The STA 103 transmits a TDLS Setup Request to the STA 101 via the AP 102 in order to establish a direct connection by means of TDLS (S701). The STA 101, upon receiving the TDLS Setup Request, transmits a TDLS Setup Response via the AP 102 (S702). At this time, information shown in FIG. 8 is contained in the TDLS Setup Response.

Figure 8:
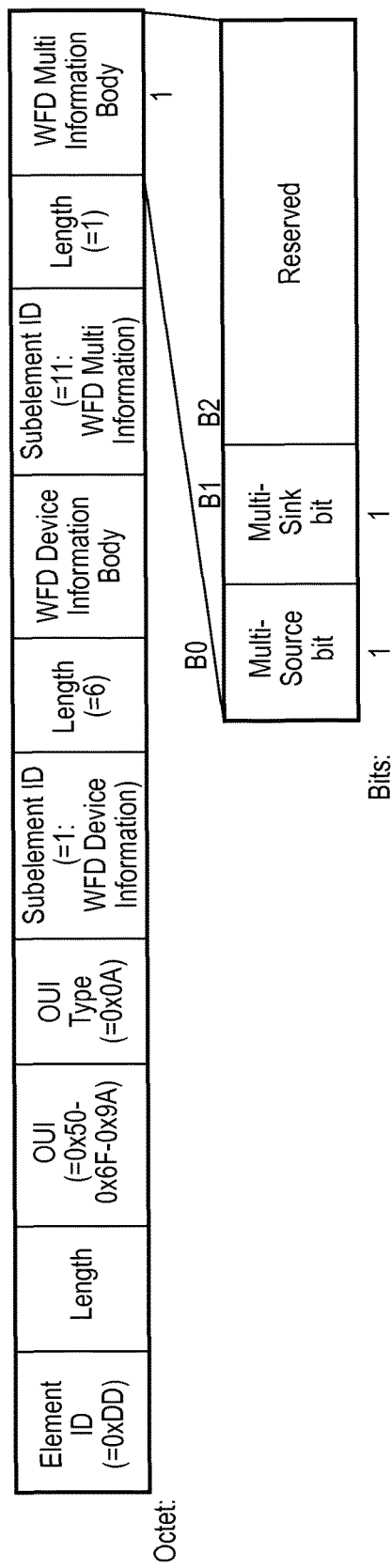
FIG. 8 is a conceptual diagram showing a structure of a signal received from a partner device in Embodiment 2.

FIG. 8 shows a structure of a Wi-Fi Display Information Element, which is an extension of the Wi-Fi Display standard. In the structure in FIG. 8, WFD Multi Information is added as a Subelement ID to the Wi-Fi Display standard. This is constituted by 1 Octet and is configured to include a Multi-Source bit, a Multi-Sink bit, and a Reserved bit, for example.

The Multi-Source bit is information indicating whether the Sink is connected to a plurality of Sources. The Multi-Source bit is set to 1 if a situation where the Sink is connected to a plurality of Sources will occur after transmitting a TDLS Setup Response, and is set to 0 if a situation will occur where the Sink is connected to one Source.

The Multi-Sink bit is information indicating whether the Source is connected to a plurality of Sinks. The Multi-Sink bit is set to 1 if the Source will be connected to a plurality of Sinks after transmitting a TDLS Setup Response or if the Source will not be connected to the Sink, and is set to 0 if the Source will be connected to one Sink.

In step S702, if the STA 101 is connected to a plurality of Sources, i.e., if the STA 101 has established direct connections by means of TDLS with a plurality of STAs, the Multi-Source bit is set to 1. The STA 103, upon receiving the TDLS Setup Response, transmits a TDLS Setup Confirm to the STA 101 (S703). Establishment of a direct connection by means of TDLS is thereby completed. The STA 103 can then determine whether the STA 101 will establish direct connections by means of TDLS with a plurality of STAs, based on the information of the TDLS Setup Response received in step S702 (S704). On the other hand, if only the STA 103 will be connected to the STA 101 as a result of TDLS Setup, the Multi-Source bit is set to 0. The STA 103 can thereby determine that the STA 101 has not established direct connections by means of TDLS with a plurality of STAs (S704).

Channel Switch Setting Control

Figure 9:
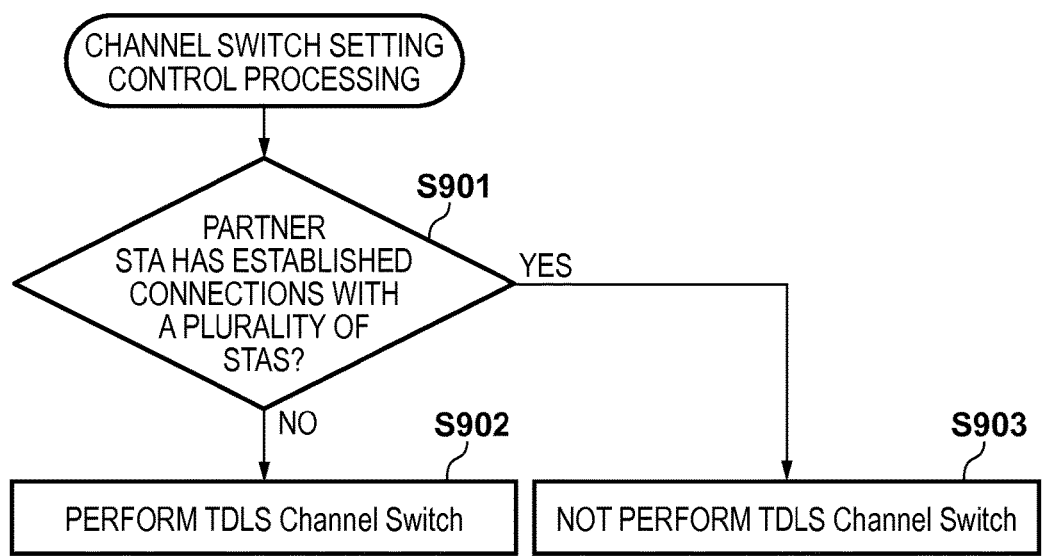
FIG. 9 is a flowchart showing a flow of channel switch setting control in Embodiment 2.

Subsequently, channel switch setting control according to the present embodiment will be described. FIG. 9 is a flowchart showing a flow of the processing executed by the channel switch setting control unit 605 in the present embodiment. This processing is executed before the STA 103 transmits an RTP packet.

In this processing, the channel switch setting control unit 605 initially determines whether the partner STA, i.e., the STA 101 has established direct connections by means of TDLS with a plurality of STAs (S901). This determination is performed based on a result of the determination processing executed by the partner device direct communication establishment determination unit 604, which has been described using FIGS. 7 and 8. At this time, if the STA 101 has not established direct connections by means of TDLS with a plurality of STAs (NO in S901), the channel switch setting control unit 605 decides to perform TDLS Channel Switch (S902). The STA 103, upon deciding to perform TDLS Channel Switch, gives the STA 101 a request to switch the channel, in accordance with usual TDLS specifications.

On the other hand, if the STA 101 has established direct connections by means of TDLS with a plurality of STAs (YES in S901), the channel switch setting control unit 605 decides not to perform TDLS Channel Switch (S903). The STA 103, upon deciding not to perform TDLS Channel Switch, transmits the RTP packet over the base channel, without switching the channel.

If, as a result, the STA 101 has established direct connections with the STA 104 as well as the STA 103, for example, the STA 103 does not give the STA 101 the request to switch the channel, and transmits the RTP packet over the base channel. Accordingly, since the STA 101 will not switch the channel, the STA 104 can also transmit the RTP packet to the STA 101 over the base channel. The communication device can thereby prevent interruption of transmission of video streaming from other communication devices (Sources) to the partner device (Sink) due to switching of the channel. On the other hand, if, for example, the STA 101 has not established a direct connection with a device other than the STA 103, the STA 103 gives the STA 101 a request to switch the channel, and transmits the RTP packet over the off-channel. In this manner, with the channel switch setting control according to the present embodiment, a communication device can determine whether to switch the channel, in accordance with a state of the partner device.

Note that, although the present embodiment has described an example of using the information of WFD Multi Information that accompanies the TDLS Setup Response in order to check the direct connection establishment number of the partner device in the processing in FIGS. 7 and 8, the present invention is not limited thereto. That is to say, other information may be used with which it can be determined whether the partner device has established a plurality of direct connections. For example, it may be determined whether the partner device has established a plurality of direct connections, based on an information element of the TDLS Setup Response. In this case, for example, information regarding whether a plurality of direct connections have been established is acquired, depending on whether 0 is designated as the TDLS channel switching bit of the Extended Capabilities Information Element, for example.

A situation regarding whether direct connections have been established with a plurality of STAs may possibly change dynamically. For this reason, the communication device may periodically give the partner device an inquiry about whether the partner device has established direct connections with a plurality of STAs. The communication device may acquire information regarding a connection state of the partner device, using a notification from the partner device that the number of STAs to which the partner device has established direct connections has changed. This notification may be periodically given, or may be given when the connection state of the partner device has changed.

Third Embodiment

In the present embodiment, a communication device (STA 101) simultaneously prompts, by itself, all partner STAs to which the STA 101 has established direct connections by means of TDLS to move to the off-channel. The STA 101 can thereby prevent an incommunicable state as a result of the STAs to which the STA 101 has established direct connections staying at different channels. Note that, since the configuration of the STA 101 according to the present embodiment has the same configuration as that shown in FIG. 2, a description thereof will be omitted. In the present embodiment, processing of the channel switch setting control unit 204 is different. For this reason, the processing of the channel switch setting control unit 204 will be described in detail using FIGS. 10 and 12.

Channel Switch Setting Control

FIG. 10 is a flowchart of the channel switch setting control unit in the present embodiment. This processing is performed every time the STA 101 receives a Beacon from the AP 102.

The channel switch setting control unit 204 initially determines whether connections have been established with a plurality of Sources, i.e., whether a plurality of direct connections by means of TDLS have been established (S1001). Here, if connections have been established with a plurality of Sources (YES in S1001), the channel switch setting control unit 204 subsequently determines whether there is a channel that can be used by all Sources (S1002). That is to say, if the STA 101 has established direct connections by means of TDLS with the STA 103 and the STA 104, the STA 101 checks channels that can be used by the STA 103 and the STA 104, and identifies a channel that can be used in common. This identification can be performed by using an Information element contained in the TDLS Setup Request or the TDLS Setup Response, for example.

If the channel switch setting control unit 204 determines that there is a channel that can be used by all Sources (YES in S1002), the channel switch setting control unit 204 determines this channel as the off-channel to be designated for TDLS Channel Switch (S1003). At this time, if there are a plurality of channels that can be used by all Sources, at least one of these channels is selected. Note that, if there is no channel that can be used by all Sources (NO in S1002), switching of the channel is not allowed.

Upon the channel switch setting control unit 204 determining the off-channel, the STA 101 transmits a TDLS Channel Switch Request to all Sources, i.e., the STA 103 and the STA 104 (S1004). At this time, the STA 101 designates the channel determined in step S1003 as the off-channel destination. The STA 101, upon transmitting the TDLS Channel Switch Request, waits for TDLS Channel Switch Responses from all Sources (S1005). If the STA 101 receives the Channel Switch Responses from all Source (YES in S1005), the STA 101 moves its channel to the off-channel (S1006). The subsequent processing is executed in accordance with a usual channel switch operation of TDLS.

On the other hand, if, in step S1005, the STA 101 is in a state of being unable to receive the Channel Switch Responses from all Sources (NO in S1005), the STA 101 waits to check if the STA 101 does not receive them for a fixed time period (S1007). If, as a result, the STA 101 does not receive them for the fixed time period, the STA 101 then determines whether the STA 101 receives one or more Channel Switch Responses (S1008). If the STA 101 receives one or more Channel Switch Responses (YES in S1008), it means that at least one Source has moved its channel to the off-channel. For this reason, the STA 101 also moves its channel to the off-channel (S1006). Note that if the STA 101 does not receive a Channel Switch Response from all Sources, the STA 101 may decide not to switch the channel. On the other hand, if the STA 101 does not receive a TDLS Channel Switch Response from any Source (NO in S1008), the STA 101 does not move its channel to the off-channel (S1009). This is because, even if the STA 101 moves its channel to the off-channel, the STA 101 cannot communicate with any Source.

If, in step S1001, the STA 101 has established a connection with only one Source (NO in S1001), the STA 101 switches its channel to the off-channel in conformity to the usual TDLS specifications (S1010).

Figure 11:
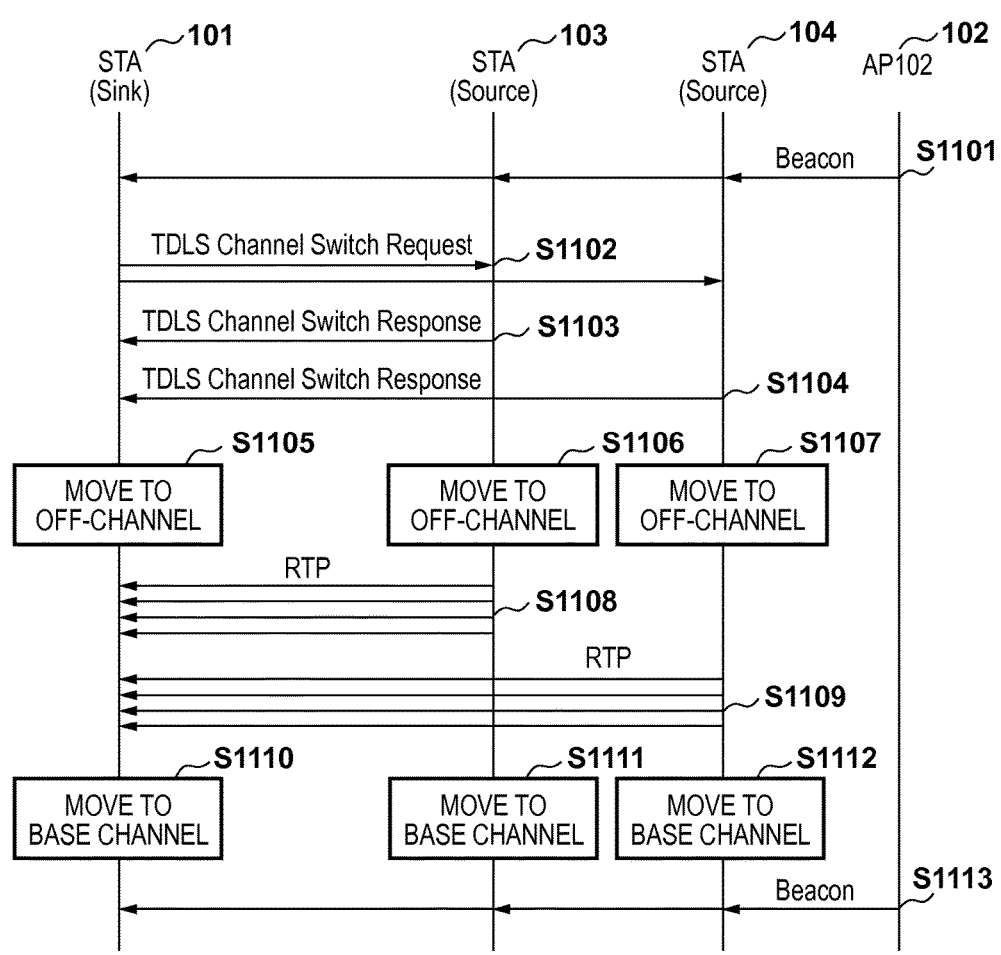
FIG. 11 is a sequence chart showing a first example of a processing flow in Embodiment 3.

Subsequently, a description will be given, using FIG. 11, of a flow of processing for giving the STA 103 and the STA 104, to which the STA 101 has established direct connections, a request to switch the channel, after receiving a Beacon from the AP 102.

In this processing, initially, the STA 101 receives a Beacon from the AP 102 (S1101). The STA 101, upon receiving the Beacon, performs determination in step S1001 of whether the STA 101 has established connections with a plurality of Sources, as described using FIG. 10. Here, in this example, the STA 101 has established connections with two Sources (STA 103 and STA 104), and accordingly advances the processing to step S1002. Note that it is assumed here that there are channels which can be used by both the STA 103 and the STA 104 (YES in S1002). For this reason, the STA 101 transmits, to the STA 103 and the STA 104, a TDLS Channel Switch Request that designates at least one of the channels that can be used by the STA 103 and the STA 104 in common (S1003, S1004, S1102).

The STA 103 and the STA 104, upon receiving the TDLS Channel Switch Request, respond using a TDLS Channel Switch Response (S1103, S1104). Note that, although the STA 104 transmits the TDLS Channel Switch Response after the STA 103 in FIG. 11, this transmission order may be reversed.

The STA 101, upon receiving the TDLS Channel Switch Responses from both the STA 103 and the STA 104 (YES in S1005), moves its channel to use to the off-channel (S1006, S1105). The STA 103 and the STA 104 also move their channel to the off-channel at the time point of transmitting the TDLS Channel Switch Responses (S1106, S1107). Note that any timing of switching the channel may be employed in steps S1105 to S1107 as long as the RTP packet can be correctly transmitted and received thereafter.

The STA 103 and the STA 104 transmits the RTP packets of video streaming after moving their channel to the off-channel (S1108, S1109). As described in Embodiment 1, the transmission order in steps S1108 and S1109 is not necessarily the same as the order shown in FIG. 11. After transmitting the RTP packets, the STA 101, the STA 103, and the STA 104 return to the base channel in accordance with the TDLS specifications (S1110 to S1112), and receive a Beacon from the AP 102 (S1113).

Figure 12:
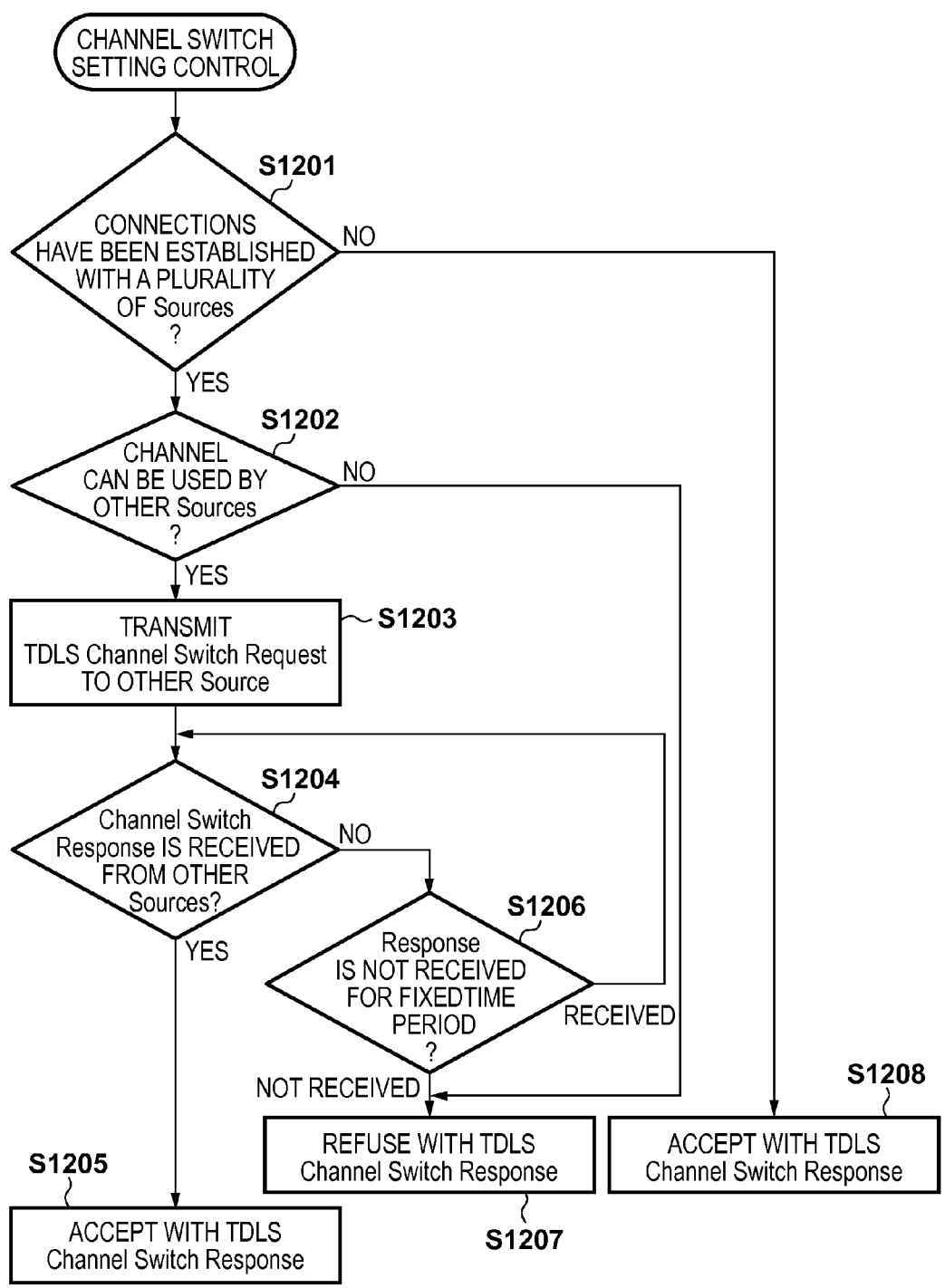
FIG. 12 is a flowchart showing a flow of another channel switch setting control in Embodiment 3.

A description has been given so far of the processing in the case where a communication device gives, by itself, a request to switch the channel. Subsequently, the following is a description of processing in the case where a communication device is given a request to switch its channel by a partner device to which the communication device has established a direct connection. FIG. 12 is a flowchart showing a processing flow in the case where the STA 101 receives a TDLS Channel Switch Request from another STA to which the STA 101 has established a direct connection by means of TDLS. This processing is executed by the channel switch setting control unit 204 when a TDLS Channel Switch Request is received from another STA.

In this processing, the channel switch setting control unit 204, upon receiving a TDLS Channel Switch Request from a direct connection partner device, initially determines whether connections have been established with a plurality of Sources (S1201). That is to say, the channel switch setting control unit 204 determines whether there are a plurality of STAs to which direct connections by means of TDLS have been established.

If the channel switch setting control unit 204 determines that connections have been established with a plurality of Sources (YES in S1201), the channel switch setting control unit 204 subsequently checks the off-channel contained in the TDLS Channel Switch Request (S1202). The channel switch setting control unit 204 then determines whether this off-channel is a channel that can be used by all Sources to which connections have been established (S1202). This determination can be executed by processing similar to step S1002. Note that, if the channel switch setting control unit 204 determines that connections have not been established with a plurality of Sources (YES in S1201), the channel switch setting control unit 204 allows switching of the channel (S1208). In this case, the STA 101 responds to the request to switch the channel, using a TDLS Channel Switch Response with a Status Code that is SUCCESS (S1208). In this case, since there is no STA to which a direct connection has been established other than the STA that has transmitted the TDLS Channel Switch Request, and there is no Source that becomes unable to communicate even if the channel is switched, switching of the channel is permitted.

If the designated off-channel is a channel that can also be used by all other Sources (YES in S1202), the STA 101 transmits a TDLS Channel Switch Request to the other Sources (S1203). At this time, the STA 101 designate, as the off-channel destination, the off-channel designated in the received TDLS Channel Switch Request.

The STA 101 then waits for reception of TDLS Channel Switch Responses from all other Sources (S1204). If the STA 101 receives the TDLS Channel Switch Responses from all other Sources (YES in S1204), the STA 101 accepts the TDLS Channel Switch Requests. That is to say, the STA 101 permits switching of the channel. In this case, the STA 101 responds to the requests to switch the channel, using a TDLS Channel Switch Response with a Status Code that is SUCCESS (S1205). The STA 101 thereby moves its channel to the off-channel simultaneously with all STAs to which the STA 101 has established direct connections, and then can continuously communicate with all Sources over the off-channel.

On the other hand, if, in step S1204, the STA 101 is in a state of being unable to receive Channel Switch Responses from the other Sources, the STA 101 continues to wait the responses for a fixed time period (S1206, S1204). If the STA 101 does not receive the Channel Switch Responses for a fixed time period, the STA 101 refuses the received TDLS Channel Switch Request. That is to say, the STA 101 does not permit switching of the channel. In this case, the STA 101 responds to the request, using a TDLS Channel Switch Response with a Status Code that is REFUSED (S1207). In the case as well where, in step S1202, the other Sources include a Source that cannot use the off-channel contained in the received TDLS Channel Switch Request, the STA 101 refuses the channel switching request (S1207). It is thereby possible, in the case where some Sources cannot switch the channel, to prevent the STA 101 from becoming unable to communicate with these Sources as a result of switching the channel.

Figure 13:
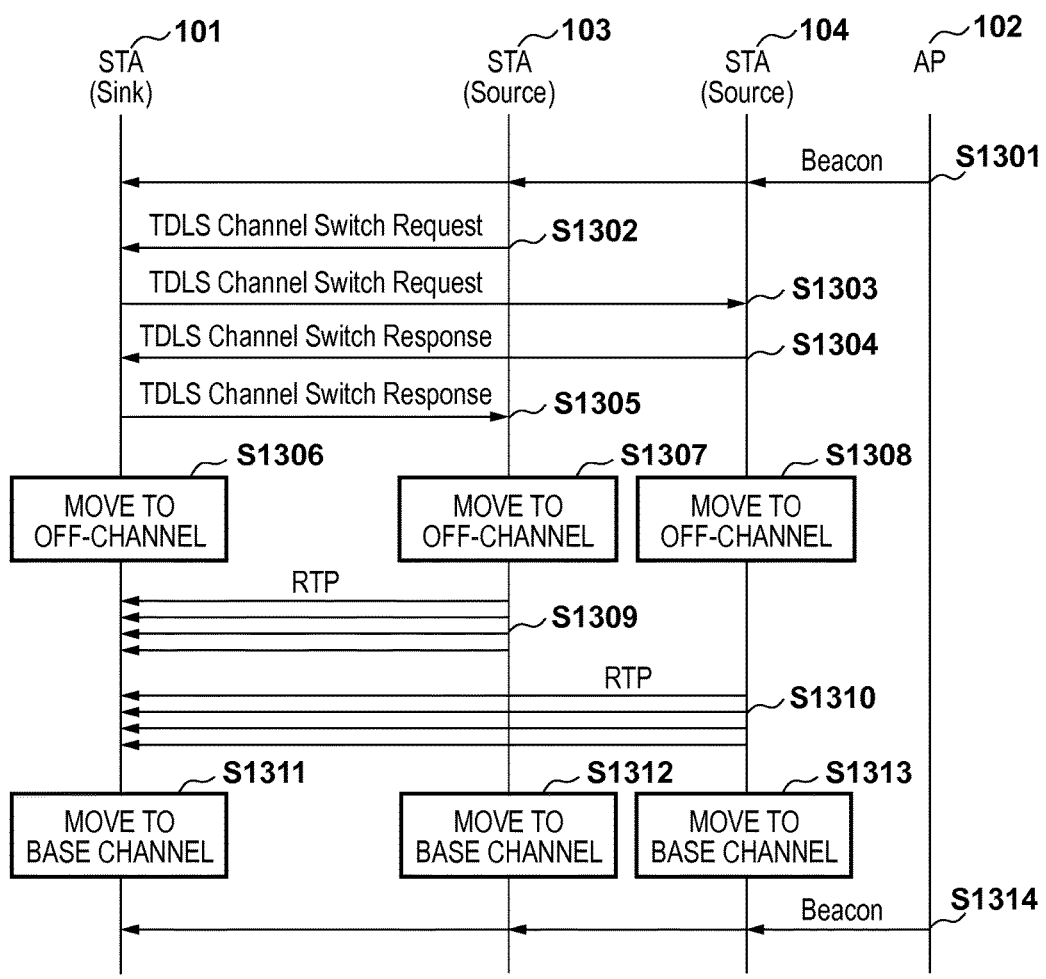
FIG. 13 is a sequence chart showing a second example of a processing flow in Embodiment 3.

Subsequently, a description will be given, using FIG. 13, of a processing flow in the case where the STA 101 receives a TDLS Channel Switch Request from the STA 103 to which the STA 101 has established a direct connection by means of TDLS. Assume that the STA 101 has established direct connections by means of TDLS with the STA 103 and the STA 104.

In this example, the STA 101, immediately after receiving a Beacon from the AP 102 (S1301), receives the TDLS Channel Switch Request from the STA 103 (S1302). At this time, the STA 101 performs determination in step S1201 of whether the STA 101 has established connections with a plurality of Sources, as described using FIG. 12. In this example, the STA 101 has established connections with two Sources (STA 103 and STA 104), and accordingly advances the processing to step S1202. Note that it is assumed here that the STA 104 can use the off-channel designated in the TDLS Channel Switch Request received by the STA 101 (YES in S1202). For this reason, the STA 101 transmits a TDLS Channel Switch Request to the Source to which the STA 101 has established a direct connection other than the STA 103, i.e., to the STA 104 (S1203, S1303). As stated in the description of FIG. 12, the off-channel designated in the received TDLS Channel Switch Request is designated as the off-channel in the TDLS Channel Switch Request at this time.

The STA 104, upon receiving the TDLS Channel Switch Request, transmits a TDLS Channel Switch Response to the STA 101 (S1304). The STA 101, upon receiving the TDLS Channel Switch Request from the STA 104 (YES in S1204), decides to permit switching of the channel (S1205). Accordingly, the STA 101 transmits a TDLS Channel Switch Response with a Status Code that is SUCCESS, in response to the TDLS Channel Switch Request in step S1302 (S1305).

The STA 101, upon transmitting the TDLS Channel Switch Response in step S1305, moves its channel to the off-channel (S1306). The STA 103, upon receiving the TDLS Channel Switch Response, moves its channel to the off-channel (S1307). The STA 104, upon transmitting the TDLS Channel Switch Response in step S1304, moves its channel to the off-channel (S1308). Note that the procedure in steps S1306 to S1308 may be executed in any order. Since the processing (S1309 to S1314) after moving to the off-channel is similar to steps S1108 to S1113 in FIG. 11, a description thereof will be omitted.

The STA 101, after receiving a Beacon from the AP 102, executes either the processing in FIG. 10 or the processing in FIG. 12, depending on whether the STA 101 has first transmitted or received the TDLS Channel Switch Request. That is to say, for example, if the STA 101 itself transmits the TDLS Channel Switch Request and thereafter receives the TDLS Channel Switch Request from a partner STA, the STA 101 executes the processing in FIG. 10. On the other hand, if the STA 101 receives, before transmitting the TDLS Channel Switch Request by itself, the TDLS Channel Switch Request from a partner STA, the STA 101 executes the processing in FIG. 12.

As described above, in the present embodiment, a communication device determines, when moving to the off-channel, whether all partner devices to which the communication device has established direct connections can move to the off-channel. The channel is switched if all partner devices can move to the off-channel, and it is thereby possible to prevent the communication device from becoming unable to communicate with a specific partner STA while moving to the off-channel. Furthermore, in the present embodiment, the communication device can move its channel to the off-channel, unlike in Embodiments 1 and 2. Accordingly, when the base channel is congested, communication can be performed over the off-channel that is not congested.

Note that the fixed period in steps S1007 and S1206 in the above description may be changed in accordance with the situation at different times. For example, the length thereof may be changed in accordance with the number of partner devices to connections have been simultaneously established. That is to say, the larger the number of STAs to which direct connections by means of TDLS have been established is, the longer time it takes to receive the TDLS Channel Switch Responses from all Sources in steps S1005 and S1204, and accordingly the wait time may be extended. In this case, in the TDLS Channel Switch Request in steps S1004 and S1203, the value of Switch Time of a Channel Switch Timing element and the value of Switch Timeout are changed. These values are for setting a time limit for setting the time by which the channel is switched.

If the TDLS Switch Response can be received only from some of the Sources a fixed number of times or more, a configuration may also be employed in which subsequently the channel is not moved to the off-channel. It is thereby possible to prevent a state where switching of the channel is repeated only with some of the Sources. Furthermore, the STA 101 may refuse the TDLS Channel Switch Request received in step S1302, depending on the value of Channel Switching Timing or Switch Timeout contained in this request. That is to say, the STA 101 may refuse the received TDLS Channel Switch Request without transmitting TDLS Channel Switch to the other Sources. In this case, if the STA 101 exchanges the TDLS Channel Switch Request and the Response with all other Sources, there is a possibility that switching of the channel takes more time than usual. For this reason, if the number of connected Sources is large and the value of Channel Switching Time or Switch Timeout is small, there are cases where the time taken to switch the channel runs short. Accordingly, in such cases, the STA 101 does not have to permit switching of the channel.

Although the STA 101 determines in steps S1005 and S1204 only whether the TDLS Channel Switch Responses are received from the partner STAs, the present invention is not limited thereto. For example, the STA 101 may determine whether any partner STA refuses switching of the channel with its TDLS Channel Switch Response. In this case, for example, the STA 101 may decide not to switch the channel if at least one partner STA refuses to switch the channel.

Fourth Embodiment

In the present embodiment, a communication device prevents, by restricting the time period of operation using the off-channel, occurrence of a situation where video streaming cannot be transmitted for a long time as a result of a STA to which the communication device has established a direct connection operating using a different channel. Note that, since the configuration of the STA 101 according to the present embodiment has the same configuration as that shown in FIG. 2, a description thereof will be omitted. In the present embodiment, processing of the channel switch setting control unit 204 is different. For this reason, the processing of the channel switch setting control unit 204 will be described.

The channel switch setting control unit 204 in the present embodiment determines a period for which the channel is switched, with regard to each STA to which a direct connection has been established. Specifically, the channel switch setting control unit 204 sets, as an approximate period for which the channel is switched for one partner STA, the time obtained by dividing a Beacon interval of the AP 102 by the total number of partner STAs to which direct connections by means of TDLS have been established. For example, if the Beacon interval of the AP 102 is 100 msec and there are two Sources to which direct connections have been established, namely the STA 103 and the STA 104, the STA 101 sets the time period for which the channel is switched for each STA to 45 msec. That is to say, the STA 101 sets the period for which the STA 101 moves to the off-channel together with the STA 103 to 45 msec, and sets the period for which the STA 101 moves to the off-channel together with the STA 104 to 45 msec. Note that the remaining 10 msec is reserved as the time required to exchange TDLS Channel Switch Requests/Responses and move to the off-channel, and as the time required to return to the base channel.

FIG. 14 is a sequence chart showing a processing flow in the present embodiment. In this processing, the STA 101, upon receiving a Beacon from the AP 102 (S1401), transmits a TDLS Channel Switch Request to the STA 103 (S1402). The STA 103, upon receiving the TDLS Channel Switch Request, transmits a TDLS Channel Switch Response (S1403). Thereafter, the STA 101 and the STA 103 moves their channel to the off-channel (S1404, S1405). Here, the procedure in either step S1404 or the S1405 may be executed first.

The STA 103, after moving its channel to the off-channel, transmits an RTP packet of video streaming to the STA 101 (S1406). After a lapse of 45 msec after moving to the off-channel, the STA 101 transmits a TDLS Channel Switch Response to the STA 103 and prompts the STA 103 to return to the base channel (S1407). Thereafter, the STA 101 and the STA 103 move their channel to the base channel (S1410, S1411). Here, the procedure in either step S1410 or S1411 may be executed first.

The STA 101, upon moving to the base channel, then transmits a TDLS Channel Switch Request to the STA 104 (S1410). The STA 104, upon receiving the TDLS Channel Switch Request, transmits a TDLS Channel Switch Response (S1411). Thereafter, the STA 101 and the STA 104 move their channel to the off-channel (S1412, S1413). Here, the procedure in either step S1412 or S1413 may be executed first.

The STA 104, after moving its channel to the off-channel, transmits an RTP packet of video streaming to the STA 101 (S1414). The STA 101, after a lapse of 45 msec after moving its channel to the off-channel, then transmits a TDLS Channel Switch Response to the STA 104 and prompts the STA 104 to return to the base channel (S1415). Thereafter, the STA 101 and the STA 104 move their channel to the base channel (S1416, S1417). Here, the procedure in either step S1416 or S1417 may be executed first.

With the above configuration, the STAs to which direct connections have been established are sequentially prompted to move to the off-channel, and the inability to receive video streaming from some of the STAs can thereby be prevented. Furthermore, unlike in Embodiment 3, the STA 101 can prompt the partner STAs to move to the off-channel even in the case where not all partner STAs can use the same channel.

Note that, in the present embodiment, there is a period for which the STA 101 cannot receive video streaming from one of the STA 103 and the STA 104, at least for a period of 55 msec. For this reason, the STA 101 may prepare a buffer of video streaming such that disturbance of the video does not occur even when the STA 101 cannot receive video streaming for the period of 55 msec.

Note that, although the time period for which the channel is switched is determined based on the Beacon interval in the present embodiment, the STA 101 may determine the period for which the channel is switched, in accordance with the size of the video streaming buffer. For example, in the case where the STA 101 has a buffer size of 1 second and has established connections with two Sources, the STA 101 may switch the channel for 450 msec for each Source. Note that the remaining 100-msec time period is used for exchange of the TDLS Channel Switch Requests/Responses, the processing for moving to the off-channel, and the processing for returning to the base channel, as mentioned above.

The length of the period for which the channel is switched does not necessarily have to be equally set for each STA to which a direct connection has been established. For example, since a relatively large volume of data can be received in a short time from a STA having a high data rate in wireless communication, the length of the period for which the channel is switched may be set to be relatively short for this STA. Regarding a STA that transmits streaming with video source having a high bit rate, there is a relatively high possibility that the video is not displayed temporarily unless a long time period for which the STA can transmit packets is set, and accordingly the length of the period for which the channel is switched may be set to be relatively long.

In the present embodiment, when the STA 101 receives a TDLS Channel Switch Request, the STA 101 does not have to permit it. For example, in the case where the STA 101 switches its channel for communication with the STA 103 and then returns to the base channel after the communication, if the STA 101 receives a TDLS Channel Switch Request from the STA 103, the STA 101 may refuse it. Furthermore, the STA 101 may allow only spontaneous switching of the channel of its own and refuse all TDLS Channel Switch Requests from partner STAs.

Other Embodiments

In FIGS. 12 and 14, although a TDLS Channel Switch Request is transmitted every time a Beacon is received from the AP 102, it does not mean that this request has to be given every time a Beacon is received. For example, in the case where the STA 101 has other data to transmit, or in the case where there are packets to receive from the AP 102, the TDLS Channel Switch Request does not have to be transmitted during this period. The request may be configured to be transmitted after a lapse of a predetermined period after a Beacon is received, rather than immediately after the Beacon is received. The TDLS Channel Switch Request may be configured to be transmitted every time a Beacon is received for a predetermined number of times, rather than every time a Beacon is received. The TDLS Channel Switch Request may be transmitted asynchronously with a Beacon. However, the STA needs to return to the base channel by the time of receiving TIM or DTIM contained in a Beacon from the AP 102.

The above embodiments have described the case where all partner STAs to which the STA 101 has established direct connections by means of TDLS are Sources. However, the technique according to the above embodiments may also be applied in the case where a direct connection by means of TDLS is established between the STA 101 and a STA that is not a Source. For example, even when one Source transmits video to a plurality of Sinks, the technique according to the above embodiments may be applied. The technique according to the above embodiments is applicable when a direct connection is established, and video streaming does not necessarily need to be transmitted or received.

According to the present invention, a communication device can control a direct connection with another communication device, based on a situation of other connections.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-035999, filed Feb. 26, 2014, which is hereby incorporated by reference herein in its entirety.

What is claimed is:

1. A communication device comprising:
   one or more processors; and
   one or more memories including instructions that, when executed by the one or more processors, cause the communication device to:
   perform direct communication wirelessly with a first other communication device that is wirelessly connectable to an access point;
   perform, while the communication device is performing direct communication with the first other communication device, determination of at least one of whether the communication device is performing direct communication with a second other communication device that is wirelessly connectable to the access point and is different from the first other communication device wirelessly, or whether the first other communication device is performing direct communication with a third other communication device that is different from the communication device wirelessly; and
   restrict switching of a channel for the direct communication between the communication device and the first other communication device based on the determination,
   wherein if it is determined that the communication device is performing direct communication with the second other communication device or if it is determined that the first other communication device is performing direct communication with the third other communication device, the communication device restricts switching of a channel for the direct communication between the communication device and the first other communication device.

2. The communication device according to claim 1, wherein the one or more memories include instructions that, when executed by the one or more processors, cause the communication device to acquire, from the first other communication device, information regarding whether the first other communication device is performing direct communication with the third other communication device.

3. The communication device according to claim 2, wherein the instructions cause the communication device to acquire the information using a signal received when establishing direct communication with the first other communication device.

4. The communication device according to claim 1, wherein the instructions cause the communication device to restrict switching of the channel by prohibiting switching of the channel if the communication device is performing direct communication with the second other communication device or if the first other communication device is performing direct communication with the third other communication device.

5. The communication device according to claim 1, wherein the communication device is configured to be able to:
transmit a first signal for giving a request to switch the channel to the first other communication device and the second other communication device, if the communication device is performing direct communication with the second other communication device, before the channel between the communication device and the first other communication device is switched; and
receive a response to the first signal from the first other communication device and the second other communication device.

6. The communication device according to claim 5, wherein the instructions cause the communication device to decide to switch the channel if the communication device receives the response indicating allowance of the request, from the first other communication device and the second other communication device.

7. The communication device according to claim 5, wherein the instructions cause the communication device to decide not to switch the channel if the communication device is performing direct communication with a plurality of the second other communication devices and the communication device receives the response indicating refusal of the request from at least one of the first other communication device and the plurality of the second other communication devices.

8. The communication device according to claim 5, wherein the instructions cause the communication device to decide to switch the channel if the communication device is performing direct communication with a plurality of the second other communication devices and the communication device receives the response indicating allowance of the request, from all of the first other communication device and the plurality of the second other communication devices.

9. The communication device according to claim 5, wherein the instructions cause the communication device to decide to switch the channel if the communication device is performing direct communication with a plurality of the second other communication devices and the communication device receives the response indicating allowance of the request, from at least one of the first other communication device and the plurality of the second other communication devices.

10. The communication device according to claim 5, wherein the communication device transmits the first signal to the first other communication device and the second other communication device, while designating at least one of channels to which the first other communication device and the second other communication device can switch their channel in common, based on pre-acquired information of the channels to which the first other communication device and the second other communication device can switch their channel.

11. The communication device according to claim 5, wherein the communication device can further receive, from the first other communication device, a second signal indicating that the first other communication device gives a request to switch the channel,
the communication device transmits the first signal to the second other communication device if the second signal is received, and
the communication device further transmits, to the first other communication device, a response indicating whether to allow or refuse the request given by the first other communication device to switch the channel, in accordance with a response from the second other communication device received by the communication device.

12. The communication device according to claim 1, wherein, if the communication device is performing direct communication with the second other communication device, the instructions cause the communication device to restrict, to a predetermined length or shorter, the length of a period of communication over a channel after being switched in the direct communication with the first other communication device.

13. The communication device according to claim 12, wherein the predetermined length is determined in accordance with the total number of devices with which the communication device is performing the direct communication.

14. A method for controlling a communication device that performs wirelessly direct communication with a first other communication device that is wirelessly connectable to an access point, the method comprising:
performing, while the communication device is performing direct communication with the first other communication device, determination of at least one of whether the communication device is performing direct communication with a second other communication device that is wirelessly connectable to the access point and is different from the first other communication device wirelessly, or whether the first other communication device is performing direct communication with a third other communication device that is different from the communication device wirelessly; and
restricting switching of a channel for the direct communication between the communication device and the first other communication device based on the determination,
wherein if it is determined that the communication device is performing direct communication with the second other communication device or if it is determined that the first other communication device is performing direct communication with the third other communication device, the communication device restricts switching of a channel for the direct communication between the communication device and the first other communication device.

15. A non-transitory computer-readable storage medium storing a computer program for causing a computer provided in a communication device that performs direct communication wirelessly with a first other communication device that is wirelessly connectable to an access point to execute:
performing, while the communication device is performing direct communication with the first other communication device, determination of at least one of whether the communication device is performing direct communication with a second other communication device that is wirelessly connectable to the access point is different from the first other communication device wirelessly, or whether the first other communication device is performing direct communication with a third other communication device that is different from the communication device; and restricting switching of a channel for the direct communication between the communication device and the first other communication device based on the determination, wherein if it is determined that the communication device is performing direct communication with the second other communication device or if it is determined that the first other communication device is performing direct communication with the third other communication device, the communication device restricts switching of a channel for the direct communication between the communication device and the first other communication device.

* * * * *